(12) United States Patent
Ikarashi et al.

(10) Patent No.: US 11,316,674 B2
(45) Date of Patent: Apr. 26, 2022

(54) SECURE AGGREGATE MEDIAN SYSTEM, SECURE COMPUTATION APPARATUS, SECURE AGGREGATE MEDIAN METHOD, AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,340

(22) PCT Filed: Apr. 22, 2019

(86) PCT No.: PCT/JP2019/016987
§ 371 (c)(1),
(2) Date: Oct. 21, 2020

(87) PCT Pub. No.: WO2019/208486
PCT Pub. Date: Oct. 31, 2019

(65) Prior Publication Data
US 2021/0377005 A1    Dec. 2, 2021

(30) Foreign Application Priority Data

Apr. 26, 2018  (JP) .............................. JP2018-085342

(51) Int. Cl.
*H04L 29/06*   (2006.01)
*H04L 9/08*    (2006.01)
*G09C 1/00*    (2006.01)

(52) U.S. Cl.
CPC ................ *H04L 9/085* (2013.01); *G09C 1/00* (2013.01)

(58) Field of Classification Search
None
See application file for complete search history.

(56) References Cited

U.S. PATENT DOCUMENTS 6,202,150 B1 * 3/2001 Young ................... H04L 9/0869
                                                  713/155
6,546,391 B1 * 4/2003 Tsuruoka .......... H04L 29/12009
(Continued)

FOREIGN PATENT DOCUMENTS

JP    2014-081475 A    5/2014

OTHER PUBLICATIONS

Hamada et al., "An Algorithm for Computing Aggregate Median on Secure Function Evaluation", Computer Security Symposium 2012, vol. 2012, No. 3, Oct. 30, 2012-Nov. 1, 2012, pp. 509-516, XP055507586; with English Machine translation, total 18 pages.

(Continued)

*Primary Examiner* — Maung T Lwin
(74) *Attorney, Agent, or Firm* — Xsensus LLP

(57) ABSTRACT

An aggregate median is efficiently obtained while confidentiality is kept. An order computing part generates ascending order a and descending order d within a group when a table which has been stably sorted based on a desired value attribute and a key attribute is grouped based on the key attribute. A subtracting part generates shares $\{a-d\}$, $\{d-a\}$ of a-d, d-a. A bit deleting part generates shares $\{a'\}$, $\{d'\}$ of a', d' obtained by excluding least significant bits from $\{a-d\}$, $\{d-a\}$. An equality determining part generates shares $\{a''\}$, $\{d''\}$ of $\{a''\}:=\{|a'=0|\}$, $\{d''\}:=\{|d'=0|\}$. A format converting part (15) converts $\{a''\}$, $\{d''\}$ into $[a'']$, $[d'']$. A flag applying part generates shares $[v_a]$, $[v_d]$ of $[v_a]:=[v_1 a'']$, $[v_d]:=[v_1 d'']$.

(Continued)

A permutation generating part generates shares $\{\{\sigma_a\}\}$, $\{\{\sigma_d\}\}$ of permutations $\sigma_a$, $\sigma_d$ which sort ¬a", ¬d". A median computing part generates a share [x] of a vector x.

5 Claims, 4 Drawing Sheets

(56) References Cited

U.S. PATENT DOCUMENTS

| | | | | |
|---|---|---|---|---|
| 8,055,913 | B2* | 11/2011 | Ginter | G06Q 20/24 |
| | | | | 713/194 |
| 8,458,479 | B2* | 6/2013 | Takashima | H04L 9/3252 |
| | | | | 713/176 |
| 2011/0087883 | A1* | 4/2011 | Campagna | H04L 9/3265 |
| | | | | 713/156 |
| 2013/0272521 | A1* | 10/2013 | Kipnis | H04L 9/0833 |
| | | | | 380/44 |
| 2015/0149763 | A1* | 5/2015 | Kamara | H04L 63/0428 |
| | | | | 713/150 |
| 2015/0288527 | A1* | 10/2015 | Vanstone | H04L 9/3066 |
| | | | | 713/156 |
| 2016/0321958 | A1* | 11/2016 | Ikarashi | G06F 21/60 |

OTHER PUBLICATIONS

Ikarashi et al., "Secure Database Operations Using An Improved 3-party Verifiable Secure Function Evaluation", The 2011 Symposium on Cryptography and Information Security, Kokura, Japan, The Institute of Electronics, Information and Communication Engineers, Jan. 25-28, 2011, 16 pages including English Translation.

* cited by examiner

SECURE AGGREGATE MEDIAN SYSTEM, SECURE COMPUTATION APPARATUS, SECURE AGGREGATE MEDIAN METHOD, AND PROGRAM

CROSS-REFERENCE TO RELATED APPLICATIONS

The present application is based on PCT filing PCT/JP2019/016987, filed Apr. 22, 2019, which claims priority to JP 2018-085342, filed Apr. 26, 2018, the entire contents of each are incorporated herein by reference.

TECHNICAL FIELD

The present invention relates to a secure computation technique, and, particularly, relates to a technique of computing an aggregate function while keeping confidentiality.

BACKGROUND ART

An aggregate function is an operation for obtaining statistics grouped based on a value of a key attribute when a table includes a key attribute and a value attribute. The aggregate function is also referred to as a group-by operation. The key attribute is an attribute to be used for grouping records of the table, and, examples of the key attribute can include, for example, an official position, gender, or the like. The value attribute is an attribute to be used for computing statistics, and, examples of the value attribute can include, for example, salary, body height, or the like. The group-by operation is, for example, an operation for obtaining average body height by gender in a case where the key attribute is gender, or the like. The key attribute may be a composite key including a plurality of attributes, and, for example, in a case where the key attributes are gender and age, the group-by operation may be an operation for obtaining average body height of males in their teens, average body height of males in their twenties, . . . . Non-patent literature 1 discloses a method for performing the group-by operation using secure computation.

The aggregate median is one of aggregate functions, and is an operation for obtaining a median of a desired value attribute for each group when a table is grouped based on a value of a key attribute. The median is a value which is, if the number of records of a group is an odd number, located in the center when value attributes of records belonging to the group are sorted, and if the number of records of the group is an even number, is an average value of two values located in the center. The aggregate median is also referred to as a group-by median. The group-by median is, for example, an operation for obtaining a median of salary of males in their teens, a median of salary of males in their twenties, . . . , when the key attributes are gender and age and the value attribute is salary.

PRIOR ART LITERATURE

Non-Patent Literature

Non-patent literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and Information Security, 2011.

SUMMARY OF THE INVENTION

Problems to be Solved by the Invention

In a conventional secure computation technique, the number of times of communication of log(n) where n is the number of subjects to be computed is required to obtain a group-by median, which is inefficient.

In view of the technical problem as described above, an object of the present invention is to provide a technique which is capable of efficiently obtaining a group-by median while keeping confidentiality.

Means to Solve the Problem

To solve the above-described problem, a secure aggregate median system according to one aspect of the present invention is a secure aggregate median system comprising a plurality of secure computation apparatuses, in being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the desired value attribute and a value of the key attribute, $[a]:=[a_0], \ldots, [a_{m-1}]$ being a share obtained by secret sharing a vector $a:=a_0, \ldots, a_{m-1}$ representing ascending order within a group of v when the table which has been stably sorted based on the value of the desired value attribute and the value of the key attribute is grouped based on the value of the key attribute, $[d]:[d_0], \ldots, [d_{m-1}]$ being a share obtained by secret sharing a vector $d:-d_0, \ldots, d_{m-1}$ representing descending order within a group of v when the table which has been stably sorted based on the value of the desired value attribute and the value of the key attribute is grouped based on the value of the key attribute, and |●| being a symbol returning true or false of an equality ●, each of the secure computation apparatuses comprising, a subtracting part configured to generate a share {a-d} which becomes a bit string a-d, when reconstructed, and a share {d-a} which becomes a bit string d-a, when reconstructed, by bit-decomposing computation results of $[2^\lambda+a-d]$, $[2^\lambda+d-a]$ for λ which satisfies $2^\lambda>m$ into λ bits using the share [a] and the share [d], a bit deleting part configured to generate a share {a'} which becomes a bit string a' obtained by excluding a least significant bit of a-d, when reconstructed, and a share {d'} which becomes a bit string d' obtained by excluding a least significant bit of d-a, when reconstructed, using the share [a-d] and the share [d-a], an equality determining part configured to generate shares {a"}, {d"} which become flags a", d", when reconstructed, by computing {a"}:={|a'=0|}, {|d"}:={|d'=0|} using the share {a'} and the share {d'}, a flag applying part configured to generate shares $[v_a]$, $[v_d]$ which become vectors $v_a$, $v_d$, when reconstructed, by computing $[v_a]:=[va"]$, $[v_d]:=[vd"]$ using the share [v] and the shares {a"}, {d"}, a permutation generating part configured to generate shares {{σ_a}}, {{σ_d}} which become permutations σ_a, σ_d which sort negations ¬a", ¬d" of the flags a", d", when reconstructed, using the shares {a"}, {d"}, and a median computing part configured to generate a share [x] which becomes a vector x representing a median of each group, when reconstructed, by computing $[x]:=[\sigma_a(v_a)+\sigma_d(v_d)]$ using the shares $[v_a]$, $[v_d]$ and the shares {{σ_a}}, {{σ_d}}.

Effect of the Invention

According to a secure aggregate median technique of the present invention, it is possible to efficiently obtain a group-by median with the number of times of communication of O(1) while keeping confidentiality.

DETAILED DESCRIPTION OF THE EMBODIMENTS

Figure 1:
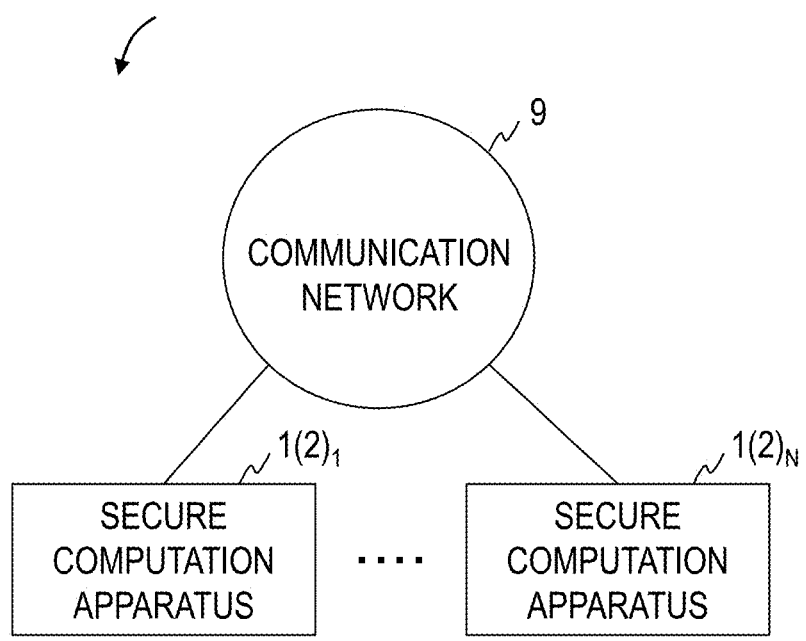
FIG. 1 is a diagram illustrating a functional configuration of a secure aggregate median system.

Embodiments of the present invention will be described in detail below. Note that the same reference numerals will be assigned to components having the same functions in the drawings, and overlapped description will be omitted.

$[x] \in [F]$ indicates that a certain value x is concealed through secret sharing, or the like, on an arbitrary ring F. $\{b\} \in \{B\}$ indicates that a certain value b of one bit is concealed through secret sharing, or the like, on a ring B which can represent one bit. $\{\{s\}\} \in \{\{S_m\}\}$ indicates that a certain permutation s which belongs to a set $S_m$ of permutations of m elements is concealed through secret sharing, or the like. Hereinafter, a secret shared value will be referred to as a "share".

In sort processing (including stable sort) in secure computation used in the embodiment, for example, sort disclosed in the following Reference literature 1 can be used. Concerning the share $\{\{s\}\}$ of the permutation s, it is only necessary to use a hybrid permutation $\{\{\pi\}\}$ disclosed in the following Reference literature 1.

[Reference literature 1] Dai Ikarashi, Koki Hamnada, Ryo Kikuchi, and Koji Chida, "A Design and an implementation of Super-high-speed Multi-party Sorting: The Day When Multi-party Computation Reaches Scripting Languages", Computer Security Symposium 2017.

Embodiment

An embodiment of the present invention is a secure aggregate median system and method for obtaining a group-by median. A median of the present embodiment is, if the number of records of a group is an odd number, a value obtained by doubling a value located in the center when value attributes of records belonging to the group are sorted, and if the number of records of the group is an even number, a value obtained by adding two values located in the center. Because it involves a significant computation cost to perform division through secure computation, it is assumed to divide by 2, a median which is reconstructed by a client which receives a share of the median from the secure aggregate median system. It goes without saying that it is possible to constitute a secure aggregate median system which outputs a median in the original meaning, by adding a procedure of performing division by 2 through secure computation to the secure aggregate median system described in the present embodiment.

A configuration example of a secure aggregate median system 100 of the embodiment will be described with reference to FIG. 1. The secure aggregate median system 100 includes N ($\geq 2$) secure computation apparatuses $1_1, \ldots, 1_N$. In the present embodiment, the secure computation apparatuses $1_1, \ldots, 1_N$ are respectively connected to a communication network 9. The communication network 9 is a communication network of a circuit switching system or a packet switching system, configured so that respective connected apparatuses can perform communication with each other, and, for example, the Internet, a local area network (LAN), a wide area network (WAN), or the like, can be used. Note that the respective apparatuses do not necessarily have to be able to perform communication online via the communication network 9. For example, it is also possible to employ a configuration where information which is to be input to the secure computation apparatuses $1_1, \ldots, 1_N$ is stored in a portable recording medium such as a magnetic tape and a USB memory, and the information is input from the portable recording medium to the secure computation apparatuses $1_1, \ldots, 1_N$ offline.

Figure 2:
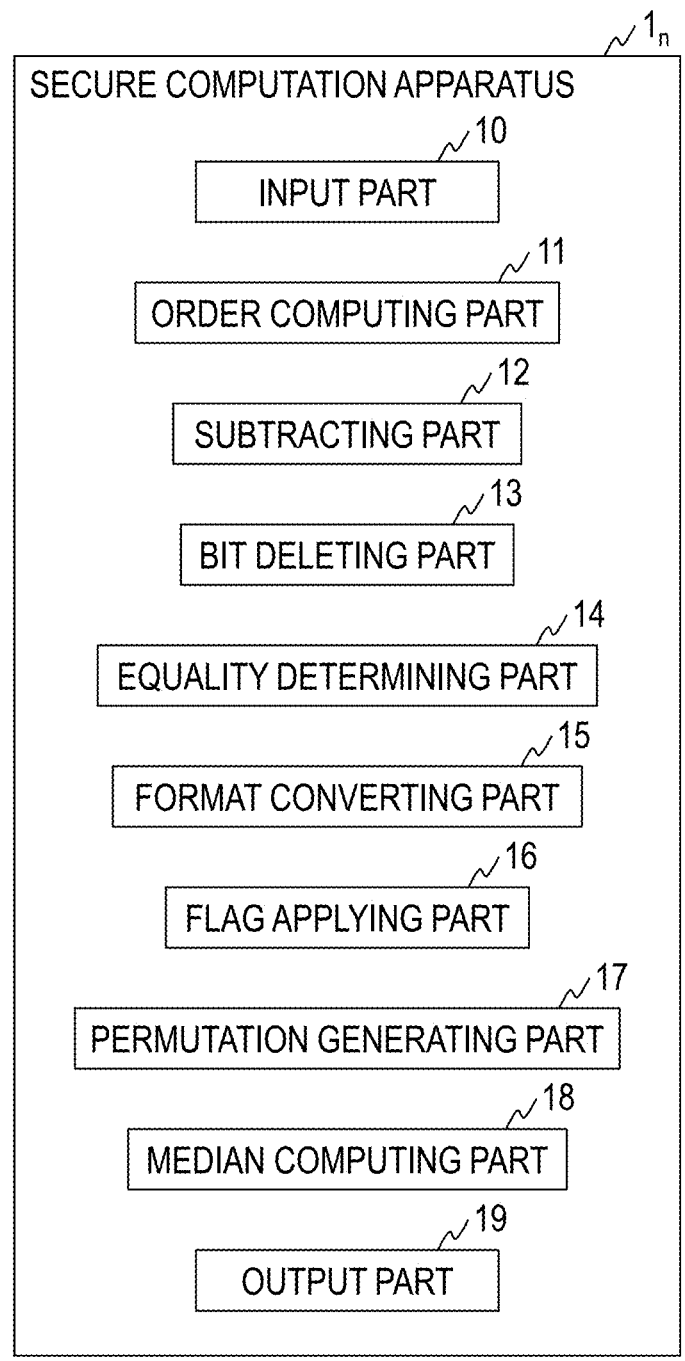
FIG. 2 is a diagram illustrating a functional configuration of a secure computation apparatus.

A configuration example of the secure computation apparatus $1_n$ (n=1, ..., N) included in the secure aggregate median system 100 of the present embodiment will be described with reference to FIG. 2. For example, as illustrated in FIG. 2, the secure computation apparatus $1_n$ includes an input part 10, an order computing part 11, a subtracting part 12, a bit deleting part 13, an equality determining part 14, a format converting part 15, a flag applying part 16, a permutation generating part 17, a median computing part 18, and an output part 19. By this secure computation apparatus $1_n$ ($1 \leq n \leq N$) performing processing in each step which will be described later while cooperating with another secure computation apparatus $1_{n'}$ (n'=1, ..., N, where n≠n'), the secure aggregate median method of the embodiment is realized.

The secure computation apparatus $1_n$ is a special apparatus configured by a special program being loaded to a publicly-known or dedicated computer having, for example, a central processing unit (CPU), a main memory (RAM: random access memory), or the like. The secure computation apparatus $1_n$, for example, executes respective kinds of processing under control by the central processing unit. Data input to the secure computation apparatus $1_n$ and data obtained through the respective kinds of processing are stored in, for example, the main memory, and the data stored in the main memory is read out to the central processing unit as necessary and is utilized for other processing. At least part of respective processing parts of the secure computation apparatus $1_n$ may be configured with hardware such as an integrated circuit.

Figure 3:
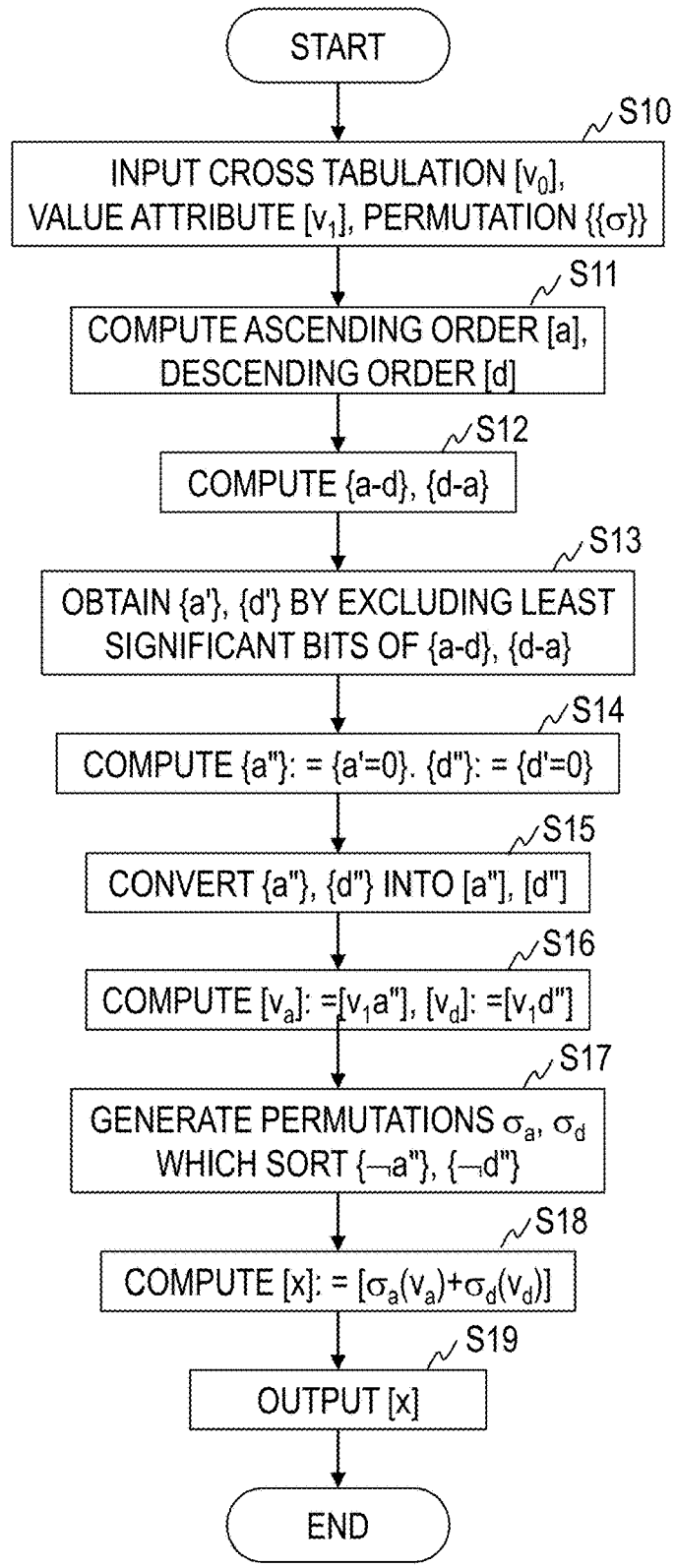
FIG. 3 is a diagram illustrating a processing procedure of a secure aggregate median method.

A processing procedure of the secure aggregate median method to be executed by the secure aggregate median system 100 of the embodiment will be described with reference to FIG. 3.

In step S10, the input part 10 of each secure computation apparatus $1_n$ receives a share $[v_0] \in [F]^m$ obtained by concealing a cross tabulation $v_0 \in F^m$ through secret sharing, a share $[v_1] \in [F]^m$ obtained by concealing a value attribute $v_1 \in F^m$ through secret sharing, and a share $\{\{\sigma\}\} \in \{\{S_m\}\}$ obtained by concealing a permutation σ through secret sharing, as inputs. m is an integer equal to or greater than 2. The input part 10 outputs the share $[v_0]$ of the cross tabulation $v_0$ and the share $\{\{\sigma\}\}$ of the permutation σ to the order computing part 11. Further, the input part 10 outputs the share $[v_1]$ of the value attribute $v_1$ to the flag applying part 16.

The cross tabulation $v_0$ is a result obtained by counting the number of records of each group. For example, the cross tabulation $v_0$ is a vector in which, when a table is stably sorted with a key attribute, records having the same value of the key attribute are put into the same group, a result obtained by counting the number of records of each group is set at elements corresponding to the number of groups from the head, and 0 is set at subsequent elements. Note that stable sort is an operation of storing order of elements of the same value in a case where elements of the same value exist, among sort operations. For example, if a table sorted in order of employee number is stably sorted with gender, a sort result in which order of the employee number is kept in each type of gender can be obtained. Hereinafter, there is a case where each element of $[v_0] \in [F]^m$ is referred to by $[v_{0\_i}] \in [F]$ (i=0, ..., m−1).

The value attribute $v_1$ is a value attribute after the table is stably sorted with the value attribute and the key attribute in ascending order. In other words, the value attribute $v_1$ is a value attribute after the table is sorted with a value of the value attribute in ascending order for each group. Hereinafter, there is a case where each element of $[v_1] \in [F]^m$ is referred to by $[v_{1\_i}] \in [F]$ (i=0, ..., m−1).

The permutation σ is a permutation which arranges values of key attributes of each group from the head one by one. For example, the permutation σ is a permutation which moves elements so that, when the table is stably sorted based on a desired value attribute and a key attribute, and when records having the same value of the key attribute are put into the same group, the last elements of each group are sequentially arranged from beginning, and subsequently, other elements are sequentially arranged. The share {{σ}} of the permutation σ is only required to be configured using the hybrid permutation {π} disclosed in the above-described Reference literature 1.

In step S11, the order computing part 11 of each secure computation apparatus $1_n$ generates a share $[a] \in [F]^m$ which becomes a vector $a := a_0, \ldots, a_{m-1} \in F$ representing ascending order within the group, when reconstructed, and a share $[d] \in [F]^m$ which becomes a vector $d := d_0, \ldots, d_{m-1} \in F$ representing descending order within the group, when reconstructed, using the share $[v_0]$ of the cross tabulation $v_0$ and the share {{σ}} of the permutation σ. Here, the ascending order and the descending order start from 1. The order computing part 11 outputs the share [a] of the ascending order a and the share [d] of the descending order d to the subtracting part 12.

The ascending order within the group can be, for example, obtained as follows. First, a share $[v_0'] \in [F]^m$ which becomes an inversely permutated cross tabulation $v_0' := \sigma^{-1}(v_0)$ obtained by inversely applying the permutation σ to the cross tabulation $v_0$, when reconstructed, is generated using the share $[v_0]$ of the cross tabulation $v_0$ and the share {{σ}} of the permutation σ. Because the cross tabulation $v_0$ is a vector in which the number of records of each group is set at elements corresponding to the number of groups from the head, and the permutation σ is a permutation which sequentially arranges last elements of each group from beginning, the inversely permutated cross tabulation $v_0'$ obtained by inversely applying the permutation σ to the cross tabulation $v_0$ becomes a vector in which the number of records of the group is set at the last element of each group. Hereinafter, there is a case where each element of $[v_0'] \in [F]^m$ is referred to by $[v_{0\_i}'] \in [F]$ (i=0, ..., m−1). Then, a share $[s] \in [F]^m$ which becomes a vector $s := s_0, \ldots, s_{m-1} \in F$, when reconstructed, is generated by computing $[s] := \text{prefix-sum}([v_0'])$ using the share $[v_0']$ of the inversely permutated cross tabulation $v_0'$. Here, prefix-sum is an operation for setting a sum of values from the 0-th element $v_{0\_0}'$ to the i-th element $v_{0\_i}'$ of an input vector $v_0'$ at the i-th element $s_i$ of an output vector s for each integer i equal to or greater than 0 and equal to or less than m−1 using m as a length of the input vector $v_0'$. Then, a share $[a] \in [F]^m$ which becomes ascending order $a := a_0, \ldots, a_{m-1} \in F$ within the group, when reconstructed, is generated by setting $[a_i] := [i - s_{i-1} + 1]$ for each integer i equal to or greater than 1 and equal to or less than m−1, and setting $[a_0] := [1]$ using the share [s] of the vector s.

The descending order within the group can be, for example, obtained as follows. First, a share $[v_0''] \in [F]^m$ which becomes a shifted cross tabulation $v_0'' := v_0''_0, \ldots, v_0''_{m-1} \in F^m$, when reconstructed, is generated by setting $[v_0''_i] := [v_{0\_i+1}]$ for each integer i equal to or greater than 0 and equal to or greater than m−2, and setting $[v_0''_{m-1}] := [0]$ using the share $[v_0]$ of the cross tabulation $v_0$. The shifted cross tabulation $v_0''$ becomes a vector in which the cross tabulation $v_0$ which is a vector representing the number of records of each group is shifted forward one by one. Then, a share $[v_0'] \in [F]^m$ which becomes an inversely permutated cross tabulation $v_0' := \sigma^{-1}(v_0'')$ obtained by inversely applying the permutation σ to the shifted cross tabulation $v_0''$, when reconstructed, using the share $[v_0'']$ of the shifted cross tabulation $v_0''$ and the share {{σ}} of the permutation σ. Because the shifted cross tabulation $v_0''$ is a vector obtained by shifting forward one by one, the cross tabulation $v_0$ in which the number of records of each group is set at elements corresponding to the number of groups from the head, and the permutation σ is a permutation which sequentially arranges last elements of each group from beginning, the inversely permutated cross tabulation $v_0'$ obtained by inversely applying the permutation σ to the shifted cross tabulation $v_0''$ becomes a vector in which the number of records of a group one group backward is set at the last element of each group. Subsequently, a share $[s'] \in [F]^m$ which becomes a vector $s' := s'_0, \ldots, s'_{m-1} \in F$, when reconstructed, is generated by computing $[s'] := \text{postfix-sum}([v_0'])$ using the share $[v_0']$ of the inversely permutated cross tabulation $v_0'$. Here, postfix-sum is an operation for setting a sum of values from the i-th element $v_{0\_i}'$ to the m−1-th element $v_{0\_m-1}'$ of an input vector $v_0'$ at the i-th element $s'_i$ of an output vector $s'$ for each integer i equal to or greater than 0 and equal to or less than m−1 using m as a length of the input vector $v_0'$. Then, a share $[d] \in [F]^m$ which becomes descending order $d := d_0, \ldots, d_{m-1} \in F$ within the group, when reconstructed, is generated by setting $[d_i] := [m - i - s'_i]$ for each integer i equal to or greater than 0 and equal to or less than m−1 using the share $[s']$ of the vector $s'$.

In step S12, the subtracting part 12 of each secure computation apparatus $1_n$ first computes $[2^\lambda + a - d]$, $[2^\lambda + d - a]$ for λ which satisfies $2^\lambda > m$ using the share [a] of the ascending order a and the share [d] of the descending order d. Then, the subtracting part 12 generates a share $\{a - d\} \in \{B_\lambda\}^m$ which becomes a bit string a-d, when reconstructed, and a share $\{d - a\} \in \{B_\lambda\}^m$ which becomes a bit string d-a, when reconstructed, by bit-decomposing $[2^\lambda + a - d]$, $[2^\lambda + d - a]$ into λ bits. The subtracting part 12 outputs the share {a-d} of the bit string a-d and the share {d-a} of the bit string d-a to the bit deleting part 13.

In step S13, the bit deleting part 13 of each secure computation apparatus $1_n$ generates shares {a'}, {d'} ∈ $\{B_{\lambda-1}\}^m$ which become a', d', when reconstructed, by excluding least significant bits from the share {a-d} of a-d and the share {d-a} of d-a. a' is a bit string obtained by excluding a least significant bit of a-d, and d' is a bit string obtained by excluding a least significant bit of d-a. The bit deleting part 13 outputs the share {a'} of a' and the share {d'} of d' to the equality determining part 14.

In step S14, the equality determining part 14 of each secure computation apparatus $1_n$ generates shares {a''}, {d''} ∈ $\{B\}^m$ which become flags a'', d'' ∈ $B^m$, when reconstructed, by computing {a"}:={|a'=0|}, {d"}:={|d'=0|} using the share {a'} of a' and the share {d'} of d'. Note that |●| is a symbol which returns true or false of an equally ●. The flags a", d" represent whether a-d, d-a are respectively equal to or greater than 0 and equal to or less than 1. Further, a" represents whether the record is a greater median, and d" represents whether the record is a smaller median. The equality determining part 14 outputs the shares {a"}, {d"} of the flags a", d" to the format converting part 15 and the permutation generating part 17.

In step S15, the format converting part 15 of each secure computation apparatus $1_n$ converts the shares {a"}, {d"}∈{B}$^m$ of the flags a", d" into shares [a"], [d"]∈[F]$^m$ through secret sharing on an arbitrary ring F. The format converting part 15 outputs the shares [a"], [d"] of the flags a", d" to the flag applying part 16.

In step S16, the flag applying part 16 of each secure computation apparatus $1_n$ generates shares [$v_a$], [$v_d$]∈[F]$^m$ which become vectors $v_a$, $v_d$∈F$^m$, when reconstructed, by computing [$v_a$]:=[$v_1$a"], [$v_d$]:=[$v_1$d"] using the share [$v_1$] of the value attribute $v_1$ and the shares {a"}, {d"} of the flags a", d". The flag applying part 16 outputs the shares [$v_a$], [$v_d$] of the vectors $v_a$, $v_d$ to the median computing part 18.

In step S17, the permutation generating part 17 of each secure computation apparatus $1_n$ first generates shares {¬a"}, {¬d"}∈{B}$^m$ which become negations ¬a", ¬d" of the flags a", d", when reconstructed, using the shares {a"}, {d"} of the flags a", d". Then, the permutation generating part 17 generates shares {{$\sigma_a$}}, {{$a_d$}}∈{{$S_m$}} which become permutations $\sigma_a$, $\sigma_d$ which sort the negations ¬a", ¬d" of the flags a", d", when reconstructed, using the shares {¬a"}, {¬d"} of the negations ¬a", ¬d" of the flags a", d". The permutation generating part 17 outputs the shares {{$\sigma_a$}}, {{$\sigma_d$}} of the permutations $\sigma_a$, $\sigma_d$ to the median computing part 18.

In step S18, the median computing part 18 of each secure computation apparatus $1_n$ generates a share [x]∈[F]$^m$ which becomes a vector x representing a median of each group, when reconstructed, by computing [x]:=[$\sigma_a(v_a)$+$\sigma_d(v_d)$] using the shares [$v_a$], [$v_d$] of the vectors $v_a$, $v_d$ and the shares {{$\sigma_a$}}, {{$\sigma_d$}} of the permutations $\sigma_a$, $\sigma_d$. The median computing part 18 outputs the share [x] of the median x to the output part 19.

In step S19, the output part 19 of each secure computation apparatus $1_n$ outputs the share [x] of the median x.

<Modification>

In the above-described embodiment, a configuration has been described where the share [$v_0$] of the cross tabulation $v_0$, the share [$v_1$] of the value attribute $v_1$, and the share {{$\sigma$}} of the permutation $\sigma$ are input to the input part 10. In a modification, a configuration will be described where a share obtained by concealing the table through secret sharing, or the like, is input to the input part 10, and after the share [$v_0$] of the cross tabulation $v_0$ and the share {{$\sigma$}} of the permutation $\sigma$ are obtained, a group-by median is computed in accordance with the procedure described in the above-described embodiment.

Figure 4:
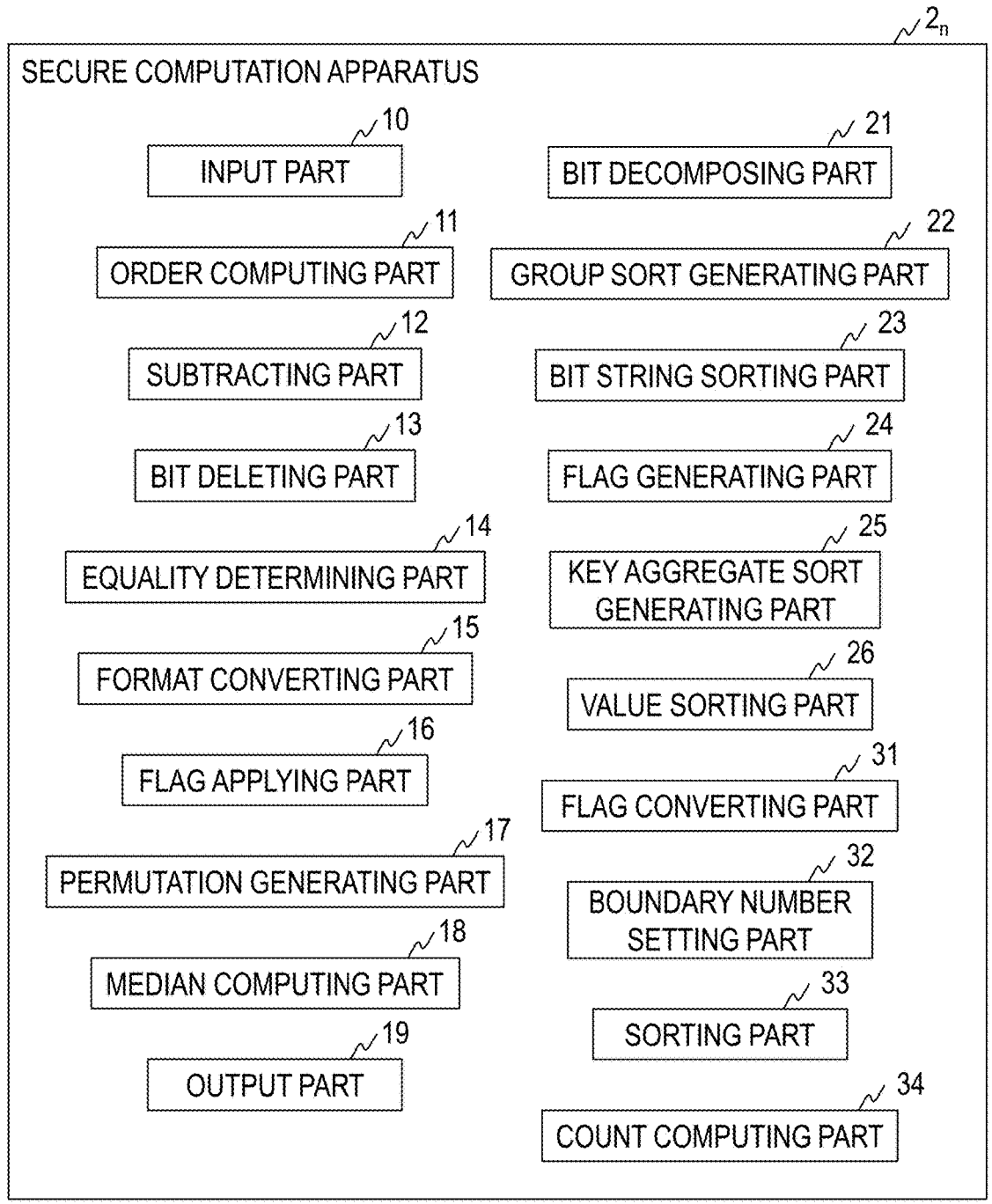
FIG. 4 is a diagram illustrating a functional configuration of a secure computation apparatus of a modification.

For example, as illustrated in FIG. 4, a secure computation apparatus $2_n$ (n=1, . . . , N) of the modification includes a bit decomposing part 21, a group sort generating part 22, a bit string sorting part 23, a flag generating part 24, a key aggregate sort generating part 25, a value sorting part 26, a flag converting part 31, a boundary number setting part 32, a sorting part 33 and a count computing part 34, in addition to the respective processing parts provided at the secure computation apparatus $1_n$ (n=1, . . . , N) of the embodiment.

Only a difference from the secure aggregate median system 100 of the embodiment will be described below.

The input part 10 of each secure computation apparatus $2_n$ receives shares [$k_0$], . . . , [$k_{nk-1}$]∈[F]$^m$ obtained by respectively concealing $n_k$ key attributes $k_0$, . . . , $k_{nk-1}$∈F$^m$ through secret sharing, and shares [$v_0$], . . . , [$v_{na-1}$]∈[F]$^m$ obtained by respectively concealing $n_a$ value attributes $v_0$, . . . , $v_{na-1}$∈F$^m$ through secret sharing, as inputs. $n_k$, $n_a$ are integers equal to or greater than 1. Further, it is assumed that a desired value attribute $v_1$ for which it is desired to obtain a median among the value attributes v'$_0$, . . . , v'$_{na-1}$ has been sorted in ascending order. Hereinafter, there is a case where each element of [$k_j$]∈[F]$^m$ (j=0, . . . , $n_k$–1) is referred to by [$k_{j,i}$]∈[F] (i=0, . . . , m–1). The input part 10 outputs shares [$k_0$], . . . , [$k_{nk-1}$] of the key attributes $k_0$, . . . , $k_{nk-1}$ to the bit decomposing part 21.

The bit decomposing part 21 of each secure computation apparatus $2_n$ bit-decomposes and concatenates the shares [$k_0$], . . . , [$k_{nk-1}$] of the key attributes $k_0$, . . . , $k_{nk-1}$ and obtains a share {b}∈{B}$^\lambda$ which becomes a bit string b:=$b_0$, . . . , $b_{m-1}$∈B$^\lambda$ which is a concatenated bit expression of the key attributes $k_0$, . . . , $k_{nk-1}$, when reconstructed. Note that λ is a bit length of the bit string b, and a sum of bit lengths of respective $b_i$ (i=0, . . . , m–1). In other words, {$b_i$} is a bit string obtained by concatenating bit expression of the i-th elements [$k_{0,i}$], . . . , [$k_{nk-1,i}$] of the respective shares [$k_0$], . . . , [$k_{nk-1}$] of the key attributes $k_0$, . . . , $k_{nk-1}$. The bit decomposing part 21 outputs the share {b} of the bit string b to the group sort generating part 22.

The group sort generating part 22 of each secure computation apparatus $2_n$ generates a share {{$\sigma_0$}}∈{{$S_m$}} which becomes a permutation $\sigma_0$ which stably sorts the bit string b in ascending order, when reconstructed, using the share {b} of the bit string b. Because the bit string b is a concatenated bit expression of the key attributes $k_0$, . . . , $k_{nk-1}$, it can be said that the permutation $\sigma_0$ is an operation of grouping records by rearranging the records so that records having equal values of the key attributes $k_0$, . . . , $k_{nk-1}$ are successive. The group sort generating part 22 outputs the share {b} of the bit string b and the share {{$\sigma_0$}} of the permutation $\sigma_0$ to the bit string sorting part 23. Further, the group sort generating part 22 outputs the share {{$\sigma_0$}} of the permutation $\sigma_0$ to the value sorting part 26.

The bit string sorting part 23 of each secure computation apparatus $2_n$ obtains a share {b'}∈{B}$^\lambda$ which becomes a sorted bit string b':=b'$_0$, . . . , b'$_{m-1}$∈B$^\lambda$ obtained by sorting the bit string b with the permutation $\sigma_0$, when reconstructed, using the share {b} of the bit string b and the share {{$\sigma_0$}} of the permutation $\sigma_0$. The bit string sorting part 23 outputs the share {b'} of the sorted bit string b' to the flag generating part 24.

The flag generating part 24 of each secure computation apparatus $2_n$ generates a share {e}{B}$^m$ which becomes a flag e:=$e_0$, . . . , $e_{m-1}$∈B$^m$, when reconstructed, by setting {$e_i$}:=b'$_i$≠{b'$_{i+1}$} for each integer i equal to or greater than 0 and equal to or less than m–2 and setting {$e_{m-1}$}:={1}, using the share {b'} of the sorted bit string b'. Because true is set at the flag $e_i$ if the i-th element b'$_i$ of the sorted bit string b' is different from the i+1-th element b'$_{i+1}$, the flag $e_i$ becomes a flag which indicates the last element of each group (that is, an element immediately before the boundary between groups). The flag generating part 24 outputs the share {e} of the flag e to the key aggregate sort generating part 25 and the flag converting part 31.

The key aggregate sort generating part 25 of each secure computation apparatus $2_n$ first generates a share {e'}∈{B}$^m$ which becomes a flag e' which is a negation ¬e of the flag e, when reconstructed, using the share {e} of the flag e. In other words, the key aggregate sort generating part 25 sets $\{e'_i\}:=\{\neg e_i\}$ for each integer i equal to or greater than 0 and equal to or less than m−1. Then, the key aggregate sort generating part 25 generates a share $\{\{\sigma\}\}\in\{\{S_m\}\}$ which becomes a permutation σ which stably sorts the flag e' in ascending order, when reconstructed, using the share {e'} of the flag e'. The key aggregate sort generating part 25 outputs the share $\{\{\sigma\}\}$ of the permutation σ to the sorting part 33. Further, the key aggregate sort generating part 25 outputs the share $\{\{\sigma\}\}$ of the permutation σ to the order computing part 11.

The value sorting part 26 of each secure computation apparatus $2_n$ generates shares $[v'_0], \ldots, [v'_{na-1}]$ which become sorted value attributes $v'_0, \ldots, v'_{na-1}$ obtained by sorting value attributes $v_0, \ldots, v_{na-1}$ with the permutation $\sigma_0$, when reconstructed, using shares $[v_0], \ldots, [v_{na-1}]$ of the value attributes $v_0, \ldots, v_{na-1}$ and the share $\{\{\sigma_0\}\}$ of the permutation $\sigma_0$. The value sorting part 26 outputs a share for which it is desired to obtain a median among the shares $[v'_0], \ldots, [v'_{na-1}]$ of the sorted value attributes $v'_0, \ldots, v'_{na-1}$, to the flag applying part 16 as the share $[v_1]$ of the desired value attribute $v_1$.

The flag converting part 31 of each secure computation apparatus $2_n$ converts the share $\{e\}\in\{B\}^m$ of the flag e into a share $[e]\in[F]^m$ through secret sharing on an arbitrary ring F. The flag converting part 31 outputs the share [e] of the flag e to the boundary number setting part 32.

The boundary number setting part 32 of each secure computation apparatus $2_n$ generates a share $[x']\in[F]^m$ which becomes a vector $x':=x'_0, \ldots, x'_{m-1}\in F$, when reconstructed, by setting $[x'_i]:=[e_i?i+1:m]$ for each integer i equal to or greater than 0 and equal to or less than m−1 using the share [e] of the flag e. Here, "?" is a conditional operator (ternary operator). In other words, when $[e_i]$ is true (for example, $[e_i]=[1]$), $[x'_i]:=[i+1]$ is set, and when $[e_i]$ is false (for example, $[e_i]=[0]$), $[x'_i]:=[m]$ is set. The vector x' becomes a vector in which, when the table is stably sorted with the key attribute, records having the same value of the key attribute are put into the same group, a position from the head of the next element is set at the last element of each group, and the number of records of the whole table is set at the other elements. In other words, at the last element of each group, a total value obtained by accumulating the number of records of respective groups from the head group to the group is set. The boundary number setting part 32 outputs the share [x'] of the vector x' to the sorting part 33.

The sorting part 33 of each secure computation apparatus $2_n$ generates a share $[\sigma(x')]\in[F]^m$ which becomes a sorted vector (σ(x') obtained by sorting the vector x with the permutation σ, when reconstructed, using the share [x'] of the vector x' and the share $\{\{\sigma\}\}$ of the permutation σ. Hereinafter, there is a case where each element of $[94(x')]\in[F]^m$ is referred to by $[\sigma(x')_i]\in[F]$ (i=0, ..., m−1). The sorting part 33 outputs the share $[\sigma(x')]$ of the sorted vector σ(x') to count computing part 34.

The count computing part 34 of each secure computation apparatus $2_n$ generates a share $[v_0]\in[F]^m$ which becomes a vector $v_0:=v_{0\_0}, \ldots, v_{0\_m-1}\in F$ representing the number of records of each group (that is, a cross tabulation), when reconstructed, by setting $[v_{0\_i}]:=[\sigma(x')_i-\sigma(x')_{i-1}]$ for each integer i equal to or greater than 1 and equal to or less than min(g, m)−1, setting $[v_{0\_i}]:=[0]$ for each integer i equal to or greater than min(g, m) and equal to or less than m−1, and setting $[v_{0\_0}]:=[\sigma(x')_0]$ using the share $[\sigma(x')]$ of the sorted vector σ(x'). Because a total value obtained by accumulating the number of records of respective groups from the 0-th group to the i-th group is set at the i-th element $\sigma(x')_i$ of the sorted vector σ(x'), the number of records of the i-th group is set at the i-th element $v_{0\_i}$ of the cross tabulation $v_0$. The count computing part 34 outputs the share $[v_0]$ of the cross tabulation $v_0$ to the order computing part 11.

While the embodiments of the present invention have been described above, it goes without saying that a specific configuration is not limited to these embodiments, and design change, or the like, within the scope not deviating from the gist of the present invention are incorporated into the present invention. Various kinds of processing described in the embodiments are executed not only in chronological order in accordance with order of description, but also executed in parallel or individually in accordance with processing performance of apparatuses which execute the processing or as necessary.

[Program, Recording Medium]

In a case where various kinds of processing functions of the respective apparatuses described in the above-described embodiments are realized with a computer, a processing content of the functions which should be provided at the respective apparatuses is described with a program. Then, by this program being executed with the computer, various kinds of processing functions at the above-described respective apparatuses are realized on the computer.

The program describing this processing content can be recorded in a computer-readable recording medium. As the computer-readable recording medium, any medium such as, for example, a magnetic recording device, an optical disk, a magnetooptical recording medium and a semiconductor memory can be used.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer which executes such a program, for example, first, stores a program recorded in the portable recording medium or a program transferred from the server computer in the storage device of the own computer once. Then, upon execution of the processing, this computer reads out the program stored in the storage device of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on the computer at least part of the processing content may be realized with hardware.

What is claimed is:

1. A secure aggregate median system comprising a plurality of secure computation apparatuses, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the desired value attribute and a value of the key attribute, $[a]:=[a_0], \ldots, [a_{m-1}]$ being a share obtained by secret sharing a vector $a:=a_0, \ldots, a_{m-1}$ representing ascending order within a group of v when the table which has been stably sorted based on the value of the desired value attribute and the value of the key attribute is grouped based on the value of the key attribute, $[d]:=[d_0], \ldots, [d_{m-1}]$ being a share obtained by secret sharing a vector $d:=d_0, \ldots, d_{m-1}$ representing descending order within a group of v when the table which has been stably sorted based on the value of the desired value attribute and the value of the key attribute is grouped based on the value of the key attribute, and |●| being a symbol returning true or false of an equality ●, each of the secure computing apparatuses comprising processing circuitry configured to:

generate a share {a-d} which becomes a bit string a-d, when reconstructed, and a share {d-a} which becomes a bit string d-a, when reconstructed, by bit-decomposing computation results of $[2^\lambda=a-d]$, $[2^\lambda+d-a]$ for $\lambda$ which satisfies $2^\lambda>m$ into $\lambda$ bits using the share [a] and the share [d];

generate a share {a'} which becomes a bit string a' obtained by excluding a least significant bit of a-d, when reconstructed, and a share {d'} which becomes a bit string d' obtained by excluding a least significant bit of d-a, when reconstructed, using the share {a-d} and the share {d-a};

generate shares {a"}, {d"} which become flags a", d", when reconstructed, by computing {a"}:={|a'=0|}, {d"}:={|d'=0|} using the share {a'} and the share {d'};

generate shares $[v_a]$, $[v_d]$ which become vectors $v_a$, $v_d$, when reconstructed, by computing $[v_a]:=[va'']$, $[v_d]:=[vd'']$ using the share [v] and the shares {a"}, {d"};

generate shares $\{\{\sigma_a\}\}$, $\{\{\sigma_d\}\}$ which become permutations $\sigma_a$, $\sigma_d$ which sort negations ¬a", ¬d" of the flags a", d", when reconstructed, using the shares {a"}, {d"}; and generate a share [x] which becomes a vector x representing a median of each group, when reconstructed, by computing $[x]:=[\sigma_a(v_a)+\sigma_d(v_d)]$ using the shares $[v_a]$, $[v_d]$ and the shares $\{\{\sigma_a\}\}$, $\{\{\sigma_d\}\}$.

2. The secure aggregate median system according to claim 1, wherein F is an arbitrary ring, $n_k$ is an integer equal to or greater than 1, $[k_0], \ldots, [k_{nk-1}]$ are shares obtained by secret sharing key attributes $k_0, \ldots, k_{nk-1} \in F^m$, and [v'] is a share obtained by secret sharing a desired value attribute $v' \in F^m$ before the table is sorted based on the value of the key attribute, and the processing circuitry is further configured to:

generate a share $\{\{\sigma_0\}\}$ which becomes a permutation $\sigma_0$ which stably sorts a bit string b in ascending order, when reconstructed, from a share {b} of the bit string $b:=b_0, \ldots, b_{m-1}$ obtained by bit-decomposing and concatenating the key attributes $k_0, \ldots, k_{nk-1}$, when reconstructed, using the shares $[k_0], \ldots, [k_{nk-1}]$;

generate a share {b'} which becomes a sorted bit string $b':=b'_0, b'_{m-1}$ obtained by sorting the bit string b with the permutation $\sigma_0$, when reconstructed, using the share {b} and the share $\{\{\sigma_0\}\}$;

generate the share {e} which becomes the flag $e:=e_0, \ldots, e_{m-1}$, when reconstructed, by setting $\{e_i\}:=\{b'_i \neq b'_{i+1}\}$ for each integer i equal to or greater than 0 and equal to or less than m−2, and setting $\{e_{m-1}\}:=\{1\}$ using the share {b'};

generate a share $\{\{\sigma\}\}$ which becomes a permutation $\sigma$ which stably sorts a negation of the flag ¬e in ascending order, when reconstructed, using the share {e}; and generate the share [v] which becomes the value attribute v obtained by sorting the value attribute v' with the permutation $\sigma_0$, when reconstructed, using the share [v'] and the share $\{\{\sigma_0\}\}$.

3. A secure computation apparatus, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the desired value attribute and a value of the key attribute, $[a]:=[a_0], \ldots, [a_{m-1}]$ being a share obtained by secret sharing a vector $a:=a_0, \ldots, a_{m-1}$ representing ascending order within a group of v when the table which has been stably sorted based on the value of the desired value attribute and the value of the key attribute is grouped based on the value of the key attribute, $[d]:=[d_0], \ldots, [d_{m-1}]$ being a share obtained by secret sharing a vector $d:=d_0, \ldots, d_{m-1}$ representing descending order within a group of v when the table which has been stably sorted based on the value of the desired value attribute and the value of the key attribute is grouped based on the value of the key attribute, and |●| being a symbol returning true or false of an equality ●, the secure computation apparatus comprising processing circuitry configured to:

generate a share {a-d} which becomes a bit string a-d, when reconstructed, and a share {d-a} which becomes a bit string d-a, when reconstructed, by bit-decomposing computation results of $[2^\lambda+a-d]$, $[2^\lambda+d-a]$ for $\lambda$ which satisfies $2^\lambda>m$ into $\lambda$ bits using the share [a] and the share [d];

generate a share {a'} which becomes a bit string a' obtained by excluding a least significant bit of a-d, when reconstructed, and a share {d'} which becomes a bit string d' obtained by excluding a least significant bit of d-a, when reconstructed, using the share {a-d} and the share {d-a};

generate shares {a"}, {d"} which become flags a", d", when reconstructed, by computing {a"}:={|a'=0|}, {d"}:={|d'=0|} using the share {a'} and the share {d'};

generate shares $[v_a]$, $[v_d]$ which become vectors $v_a$, $v_d$, when reconstructed, by computing $[v_a]:=[va'']$, $[v_d]:=[vd'']$ using the share [v] and the shares {a"}, {d"};

generate shares $\{\{\sigma_a\}\}$, $\{\{\sigma_d\}\}$ which become permutations $\sigma_a$, $\sigma_d$ which sort negations ¬a", ¬d" of the flags a", d", when reconstructed, using the shares {a"}, {d"}; and generate a share [x] which becomes a vector x representing a median of each group, when reconstructed, by computing $[x]:=[\sigma_a(v_a)+\sigma_d(v_d)]$ using the shares $[v_a]$, $[v_d]$ and the shares $\{\{\sigma_a\}\}$, $\{\{\sigma_d\}\}$.

4. A non-transitory computer-readable recording medium on which a program recorded thereon for causing a computer to function as the secure computation apparatus according to claim 3.

5. A secure aggregate median method to be executed by a secure aggregate median system comprising a plurality of secure computation apparatuses, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the desired value attribute and a value of the key attribute, $[a]:=[a_0], \ldots, [a_{m-1}]$ being a share obtained by secret sharing a vector $a:=a_0, \ldots, a_{m-1}$ representing ascending order within a group of v when the table which has been stably sorted based on the value of the desired value attribute and the value of the key attribute is grouped based on the value of the key attribute, $[d]:=[d_0], \ldots, [d_{m-1}]$ being a share obtained by secret sharing a vector $d:=d_0, \ldots, d_{m-1}$ representing descending order within a group of v when the table which has been stably sorted based on the value of the desired value attribute and the value of the key attribute is grouped based on the value of the key attribute, and |●| being a symbol returning true or false of an equality ●, the secure aggregate median method comprising:

generating, by processing circuitry of each of the secure computation apparatuses, a share {a-d} which becomes a bit string a-d, when reconstructed, and a share {d-a} which becomes a bit string d-a, when reconstructed, by bit-decomposing computation results of $[2^\lambda+a-d]$, $[2^\lambda+d-a]$ for $\lambda$ which satisfies $2^\lambda>m$ into $\lambda$ bits using the share [a] and the share [d];

generating, by the processing circuitry of each of the secure computation apparatuses, a share {a'} which becomes a bit string a' obtained by excluding a least significant bit of a-d, when reconstructed, and a share {d'} which becomes a bit string d' obtained by excluding a least significant bit of d-a, when reconstructed, using the share {a-d} and the share {d-a};

generating, by the processing circuitry of each of the secure computation apparatuses, shares {a"}, {d"} which become flags a", d", when reconstructed, by computing $\{a"\}:=\{|a'=0|\}$, $\{d"\}:=\{|d'=0|\}$ using the share {a'} and the share {d'};

generating, by the processing circuitry of each of the secure computation apparatuses, shares $[v_a]$, $[v_d]$ which become vectors $v_a$, $v_d$, when reconstructed, by computing $[v_a]:=[va"]$, $[v_d]:=[vd"]$ using the share [v] and the shares {a"}, {d"};

generating, by the processing circuitry of each of the secure computation apparatuses, shares $\{\{\sigma_a\}\}$, $\{\{\sigma_d\}\}$ which become permutations $\sigma_a$, $\sigma_d$ which sort negations ¬a", ¬d" of the flags a", d", when reconstructed, using the shares {a"}, {d"}; and generating, by the processing circuitry of each of the secure computation apparatuses, a share [x] which becomes a vector x representing a median of each group, when reconstructed, by computing $[x]:=[\sigma_a(v_a)+\sigma_d(v_d)]$ using the shares $[v_a]$, $[v_d]$ and the shares $\{\{\sigma_a\}\}$, $\{\{\sigma_d\}\}$.

* * * * *